United States Patent
Leung et al.

(10) Patent No.: US 9,870,554 B1
(45) Date of Patent: Jan. 16, 2018

(54) MANAGING DOCUMENTS BASED ON A USER'S CALENDAR

(71) Applicants: Dominic King Hay Leung, Ontario (CA); Kenneth Kwan, Kitchener (CA)

(72) Inventors: Dominic King Hay Leung, Ontario (CA); Kenneth Kwan, Kitchener (CA)

(73) Assignee: GOOGLE INC., Mountain View, CA (US)

( * ) Notice: Subject to any disclaimer, the term of this patent is extended or adjusted under 35 U.S.C. 154(b) by 563 days.

(21) Appl. No.: 13/658,405

(22) Filed: Oct. 23, 2012

(51) Int. Cl.
*G06F 17/00* (2006.01)
*G06Q 10/10* (2012.01)
*G06F 17/30* (2006.01)
*G06Q 10/06* (2012.01)
*G06F 17/22* (2006.01)

(52) U.S. Cl.
CPC ..... *G06Q 10/109* (2013.01); *G06F 17/30528* (2013.01); *G06F 17/2235* (2013.01); *G06Q 10/06311* (2013.01)

(58) Field of Classification Search
CPC .......... G06Q 10/06311; G06Q 10/109; G06Q 17/2235; G06Q 17/30528
See application file for complete search history.

(56) References Cited

U.S. PATENT DOCUMENTS

| 4,694,406 A | 9/1987 | Shibui et al. |
| 4,853,878 A | 8/1989 | Brown |
| 5,038,138 A | 8/1991 | Akiyama et al. |
| 5,175,813 A | 12/1992 | Golding et al. |
| 5,317,306 A | 5/1994 | Abraham et al. |
| 5,361,361 A | 11/1994 | Hickman et al. |
| 5,394,523 A | 2/1995 | Harris |
| 5,398,310 A | 3/1995 | Tchao et al. |
| 5,506,951 A | 4/1996 | Ishikawa |
| 5,526,480 A | 6/1996 | Gibson |

(Continued)

FOREIGN PATENT DOCUMENTS

| CN | 1194703 | 9/1998 |
| CN | 1285557 | 2/2001 |

(Continued)

OTHER PUBLICATIONS

Timestamp from Wikipedia, accessed from https://en.wikipedialcorg/wiki/Timestamp, archived by WaybackMachine on Sep. 15, 2012, pp. 1-2.*

(Continued)

*Primary Examiner* — Scott Baderman
*Assistant Examiner* — Barbara Level
(74) *Attorney, Agent, or Firm* — Young Basile Hanlon & MacFarlane, P.C.

(57) ABSTRACT

Disclosed is a system of managing documents based on the calendar of a user. When the user has a scheduled first event, one or more documents associated with a second occurrence of an event related to the first event can be identified and associated with the first event. In this way, a user may easily access documents related to the first event. The documents can be, for example, documents accessed during the second event or documents identified by the user with the second event. The events can be part of a recurring series of events. The events and their associated documents can be displayed in a folder format.

19 Claims, 7 Drawing Sheets

(56) References Cited

U.S. PATENT DOCUMENTS

| | | |
|---|---|---|
| 5,563,996 A | 10/1996 | Tchao |
| 5,610,828 A | 3/1997 | Kodosky et al. |
| 5,623,613 A | 4/1997 | Rowe et al. |
| 5,732,399 A | 3/1998 | Katiyar et al. |
| 5,737,553 A | 4/1998 | Bartok |
| 5,812,123 A | 9/1998 | Rowe et al. |
| 5,826,241 A | 10/1998 | Stein et al. |
| 5,870,770 A | 2/1999 | Wolfe |
| 5,894,311 A | 4/1999 | Jackson |
| 5,903,267 A | 5/1999 | Fisher |
| 5,905,863 A | 5/1999 | Knowles et al. |
| 5,948,058 A | 9/1999 | Kudoh et al. |
| 5,999,159 A | 12/1999 | Isomura |
| 5,999,179 A | 12/1999 | Kekic et al. |
| 6,008,803 A | 12/1999 | Rowe et al. |
| 6,026,388 A | 2/2000 | Liddy et al. |
| 6,034,688 A | 3/2000 | Greenwood et al. |
| 6,052,121 A | 4/2000 | Webster et al. |
| 6,078,306 A | 6/2000 | Lewis |
| 6,085,205 A * | 7/2000 | Peairs et al. ............... 715/209 |
| 6,088,696 A | 7/2000 | Moon et al. |
| 6,154,740 A | 11/2000 | Shah |
| 6,184,881 B1 | 2/2001 | Medl |
| 6,246,996 B1 | 6/2001 | Stein et al. |
| 6,252,597 B1 | 6/2001 | Lokuge |
| 6,272,537 B1 | 8/2001 | Kekic et al. |
| 6,289,361 B1 | 9/2001 | Uchida |
| 6,300,967 B1 | 10/2001 | Wagner et al. |
| 6,340,979 B1 | 1/2002 | Beaton et al. |
| 6,348,935 B1 | 2/2002 | Malacinski et al. |
| 6,380,947 B1 | 4/2002 | Stead |
| 6,388,682 B1 | 5/2002 | Kurtzberg et al. |
| 6,396,513 B1 | 5/2002 | Helfman et al. |
| 6,424,995 B1 | 7/2002 | Shuman |
| 6,442,440 B1 | 8/2002 | Miller |
| 6,499,026 B1 | 12/2002 | Rivette et al. |
| 6,529,744 B1 | 3/2003 | Birkler et al. |
| 6,549,218 B1 | 4/2003 | Gershony et al. |
| 6,563,518 B1 | 5/2003 | Gipalo |
| 6,582,474 B2 | 6/2003 | LaMarca et al. |
| 6,628,996 B1 | 9/2003 | Sezaki et al. |
| 6,631,398 B1 | 10/2003 | Klein |
| 6,640,230 B1 | 10/2003 | Alexander et al. |
| 6,700,591 B1 | 3/2004 | Sharpe |
| 6,701,346 B1 | 3/2004 | Klein |
| 6,738,787 B2 | 5/2004 | Stead |
| 6,782,393 B1 | 8/2004 | Balabanovic et al. |
| 6,980,977 B2 | 12/2005 | Hoshi et al. |
| 7,073,129 B1 | 7/2006 | Robarts et al. |
| 7,107,268 B1 | 9/2006 | Zawadzki et al. |
| 7,117,445 B2 | 10/2006 | Berger |
| 7,120,646 B2 | 10/2006 | Streepy, Jr. |
| 7,127,476 B2 | 10/2006 | Narahara |
| 7,137,074 B1 | 11/2006 | Newton et al. |
| 7,139,800 B2 | 11/2006 | Bellotti et al. |
| 7,209,246 B2 | 4/2007 | Suda et al. |
| 7,243,125 B2 | 7/2007 | Newman et al. |
| 7,295,995 B1 | 11/2007 | York et al. |
| 7,320,105 B1 | 1/2008 | Sinyak et al. |
| 7,395,507 B2 | 7/2008 | Robarts et al. |
| 7,401,131 B2 | 7/2008 | Robertson et al. |
| 7,421,664 B2 | 9/2008 | Wattenberg et al. |
| 7,421,690 B2 | 9/2008 | Forstall et al. |
| 7,428,579 B2 | 9/2008 | Libbey, IV et al. |
| 7,441,194 B2 | 10/2008 | Vronay et al. |
| 7,454,716 B2 | 11/2008 | Venolia |
| 7,487,458 B2 | 2/2009 | Jalon et al. |
| 7,505,974 B2 | 3/2009 | Gropper |
| 7,512,901 B2 | 3/2009 | Vong et al. |
| 7,523,126 B2 | 4/2009 | Rivette et al. |
| 7,526,559 B1 | 4/2009 | Phillips |
| 7,533,064 B1 | 5/2009 | Boesch |
| 7,769,579 B2 | 8/2010 | Zhao et al. |
| 7,774,328 B2 | 8/2010 | Hogue et al. |
| 7,831,834 B2 | 11/2010 | Hickman et al. |
| 7,836,391 B2 | 11/2010 | Tong |
| 7,844,906 B2 | 11/2010 | Berger |
| 7,904,387 B2 | 3/2011 | Geering |
| 7,908,566 B2 | 3/2011 | Wilcox et al. |
| 7,917,867 B2 | 3/2011 | Wattenberg et al. |
| 7,921,176 B2 | 4/2011 | Madnani |
| 8,150,928 B2 | 4/2012 | Fang |
| 8,199,899 B2 | 6/2012 | Rogers et al. |
| 8,224,802 B2 | 7/2012 | Hogue |
| 8,260,785 B2 | 9/2012 | Hogue et al. |
| 8,281,247 B2 | 10/2012 | Daniell et al. |
| 8,310,510 B2 | 11/2012 | Asahina |
| 8,346,620 B2 | 1/2013 | King et al. |
| 8,370,275 B2 | 2/2013 | Bhattacharya et al. |
| 8,386,914 B2 | 2/2013 | Baluja et al. |
| 8,458,046 B2 | 6/2013 | Myslinski |
| 8,726,179 B2 * | 5/2014 | Yerkes et al. ............... 715/764 |
| 8,875,030 B1 | 10/2014 | Loverin et al. |
| 9,143,468 B1 | 9/2015 | Cohen et al. |
| 9,652,741 B2 * | 5/2017 | Goldberg ............ G06Q 10/101 |
| 2001/0044741 A1 | 11/2001 | Jacobs et al. |
| 2002/0004793 A1 | 1/2002 | Keith, Jr. |
| 2002/0019827 A1 | 2/2002 | Shiman et al. |
| 2002/0051015 A1 | 5/2002 | Matoba |
| 2002/0073112 A1 | 6/2002 | Kariya |
| 2002/0073157 A1 | 6/2002 | Newman et al. |
| 2002/0080187 A1 | 6/2002 | Lawton |
| 2002/0084991 A1 | 7/2002 | Harrison et al. |
| 2002/0099775 A1 | 7/2002 | Gupta et al. |
| 2002/0120702 A1 | 8/2002 | Schiavone et al. |
| 2002/0120858 A1 | 8/2002 | Porter et al. |
| 2002/0128047 A1 | 9/2002 | Gates |
| 2002/0138834 A1 | 9/2002 | Gerba et al. |
| 2002/0174183 A1 | 11/2002 | Saeidi |
| 2002/0186252 A1 | 12/2002 | Himmel et al. |
| 2002/0188689 A1 | 12/2002 | Michael |
| 2002/0194280 A1 | 12/2002 | Altavilla et al. |
| 2003/0014482 A1 | 1/2003 | Toyota et al. |
| 2003/0101065 A1 | 5/2003 | Rohall et al. |
| 2003/0120719 A1 | 6/2003 | Yepishin et al. |
| 2003/0120762 A1 | 6/2003 | Yepishin et al. |
| 2003/0146941 A1 | 8/2003 | Bailey et al. |
| 2003/0154212 A1 | 8/2003 | Schirmer et al. |
| 2003/0163537 A1 | 8/2003 | Rohall et al. |
| 2003/0167310 A1 | 9/2003 | Moody et al. |
| 2003/0182310 A1 * | 9/2003 | Charnock ......... G06F 17/30716 |
| 2003/0191816 A1 | 10/2003 | Landress et al. |
| 2003/0195963 A1 | 10/2003 | Song et al. |
| 2003/0226152 A1 | 12/2003 | Billmaier et al. |
| 2004/0046776 A1 | 3/2004 | Phillips et al. |
| 2004/0058673 A1 | 3/2004 | Irlam et al. |
| 2004/0068544 A1 | 4/2004 | Malik et al. |
| 2004/0073616 A1 | 4/2004 | Fellenstein et al. |
| 2004/0122846 A1 | 6/2004 | Chess et al. |
| 2004/0168133 A1 * | 8/2004 | Wynn ................ G06Q 10/109 |
| | | 715/255 |
| 2004/0243926 A1 | 12/2004 | Trenbeath et al. |
| 2004/0260756 A1 | 12/2004 | Forstall et al. |
| 2004/0268265 A1 | 12/2004 | Berger |
| 2005/0004989 A1 | 1/2005 | Satterfield et al. |
| 2005/0066037 A1 | 3/2005 | Song et al. |
| 2005/0108345 A1 | 5/2005 | Suzuki |
| 2005/0108351 A1 | 5/2005 | Naick et al. |
| 2005/0144569 A1 | 6/2005 | Wilcox et al. |
| 2005/0144570 A1 | 6/2005 | Loverin et al. |
| 2005/0144571 A1 | 6/2005 | Loverin et al. |
| 2005/0144572 A1 | 6/2005 | Wattenberg et al. |
| 2005/0149858 A1 | 7/2005 | Stern et al. |
| 2005/0160158 A1 | 7/2005 | Firebaugh et al. |
| 2005/0223058 A1 | 10/2005 | Buchheit et al. |
| 2005/0246420 A1 | 11/2005 | Little, II |
| 2006/0020548 A1 | 1/2006 | Flather |
| 2006/0123091 A1 | 6/2006 | Ho |
| 2006/0200523 A1 | 9/2006 | Tokuda et al. |
| 2006/0248573 A1 | 11/2006 | Pannu et al. |
| 2006/0271381 A1 | 11/2006 | Pui |
| 2007/0143317 A1 | 6/2007 | Hogue et al. |
| 2007/0150513 A1 * | 6/2007 | Vanden Heuvel .... G06F 17/278 |
| 2007/0150800 A1 | 6/2007 | Betz et al. |

(56) References Cited

U.S. PATENT DOCUMENTS

| | | |
|---|---|---|
| 2007/0192423 A1 | 8/2007 | Karlson |
| 2007/0198343 A1 | 8/2007 | Collison et al. |
| 2007/0233786 A1* | 10/2007 | Rothley ........................ 709/204 |
| 2008/0082925 A1* | 4/2008 | Brush ................ G06Q 10/1093 715/744 |
| 2008/0114838 A1 | 5/2008 | Taylor |
| 2008/0222170 A1* | 9/2008 | Farnham ................ G06F 3/0481 |
| 2008/0270935 A1 | 10/2008 | Wattenberg et al. |
| 2009/0100009 A1 | 4/2009 | Karp |
| 2009/0132273 A1 | 5/2009 | Boesch |
| 2009/0222747 A1* | 9/2009 | May ...................... G06Q 10/109 715/764 |
| 2009/0252312 A1* | 10/2009 | Muniz ............... H04M 1/72547 379/112.01 |
| 2009/0287780 A1 | 11/2009 | Gawor et al. |
| 2010/0070372 A1 | 3/2010 | Watfa et al. |
| 2010/0274628 A1 | 10/2010 | Kunz et al. |
| 2010/0306265 A1* | 12/2010 | Jones, III ...................... 707/776 |
| 2011/0043652 A1 | 2/2011 | King et al. |
| 2011/0060584 A1 | 3/2011 | Ferrucci et al. |
| 2011/0099510 A1 | 4/2011 | Wilcox et al. |
| 2011/0137751 A1 | 6/2011 | Stein et al. |
| 2011/0166939 A1 | 7/2011 | Junkin et al. |
| 2011/0167357 A1* | 7/2011 | Benjamin ........... H04L 12/1818 715/753 |
| 2011/0209159 A1* | 8/2011 | Baratz et al. ................. 718/108 |
| 2011/0246361 A1 | 10/2011 | Geering |
| 2012/0078826 A1 | 3/2012 | Ferrucci et al. |
| 2012/0124053 A1 | 5/2012 | Ritchford et al. |
| 2012/0179502 A1* | 7/2012 | Farooq ............. G06Q 10/06311 705/7.13 |
| 2012/0221963 A1* | 8/2012 | Motoyama .......... G06F 21/6218 715/753 |
| 2012/0226646 A1 | 9/2012 | Donoho et al. |
| 2012/0253896 A1 | 10/2012 | Killoran, Jr. et al. |
| 2012/0253916 A1 | 10/2012 | Ayloo |
| 2012/0317046 A1 | 12/2012 | Myslinski |
| 2013/0013456 A1 | 1/2013 | Boesch |
| 2013/0024452 A1* | 1/2013 | Defusco et al. .............. 707/737 |
| 2013/0041764 A1 | 2/2013 | Donovan et al. |
| 2013/0054354 A1 | 2/2013 | Kunz et al. |
| 2014/0012743 A1* | 1/2014 | Hanson ................ G06Q 10/109 705/40 |
| 2014/0035949 A1* | 2/2014 | Singh ................... G06Q 10/109 345/629 |
| 2014/0143684 A1 | 5/2014 | Oh et al. |
| 2014/0172628 A1 | 6/2014 | Argue et al. |
| 2014/0244638 A1* | 8/2014 | Yerkes et al. ................. 707/736 |
| 2015/0304250 A1 | 10/2015 | Zomet et al. |

FOREIGN PATENT DOCUMENTS

| | | |
|---|---|---|
| EP | 1077417 | 2/2001 |
| EP | 1232434 | 8/2002 |
| JP | 08286871 | 11/1996 |
| JP | 09326822 | 12/1997 |
| JP | 2001325296 | 11/2001 |
| JP | 2003271526 | 9/2003 |
| KR | 20020050785 | 6/2002 |
| WO | WO9724684 | 7/1997 |
| WO | WO0123995 | 4/2001 |
| WO | WO2011049399 | 4/2011 |

OTHER PUBLICATIONS

Folder (computing) From Wikipedia, (https://simple.wikipedia.org/wiki/Folder_(computing), archived by Wayback Machine on May 28, 2012, p. 1.*

How to Use Outlook Express, UCLA, Jan. 11, 2008, available at ,http://web.archive.org/web/20080111060000/http://www.bol.ucla.edu/software/win/oe/.

http://howto.cnet.com/8301-11310_39-57585518-285/how-to-send-money-via-gmail/.

http://www.google.com/wallet/send-money/.

Piers Dillon-Scott; "Gmail's new adds are about to invade your inbox". http://sociable.co/web/now-gmail-is-sending-ads-to-you-kind-of/. May 27, 2012.

Rohall, Steven L., et al., "Email Visualizations to Aid Communications", IEEE Symposium on Information Visualization, Oct. 22-23, 2001, 5 pages.

Venolia, Gina, et al., "Understanding Sequence and Reply Relationship within Email Converstations: A Mixed-Model Visualization", Paper: Intergrating Tools and Tasks, Volume No. 5, Issue No. 1, Ft. Lauderdale, Florida, Apr. 5-10, 2003, pp. 361-368.

Pamela Parker. "Google Testing Unique AdWords Format Designed for Gmail," Aug. 18, 2011, Search Engine Land, available at http://web.archive.org/web/20111028150326/http://searchengineland.com/google-testing-unique-adwords-format-designed-for-gmail.

Jason Comwell, "A preview of Gmails new look," Jun. 30, 2011, The Official Gmail Blog, available at http://web.archive.org/web/20110703043327/http://gmailblog.blogspot.com/2011/06/preview-of-gmails-new-look-html.

* cited by examiner

MANAGING DOCUMENTS BASED ON A USER'S CALENDAR

TECHNICAL FIELD

This disclosure relates to prioritizing and managing documents based on information gathered from a user's calendar, and in particular to managing documents related to upcoming events included in a user's calendar program.

BACKGROUND

Calendar software programs manage and display events for a computing device user by organizing and displaying the events chronologically. Events can include meetings, where multiple users each having calendar software programs can have a copy of the same event in their calendar software program. When the time for the meeting occurs, the multiple users can either gather physically for a meeting or form a "virtual" meeting by logging into a voice or video conference system that permits the meeting participants to communicate despite being in physically separate locations.

SUMMARY

Disclosed herein are aspects of systems, methods and apparatuses for managing documents based on a user's calendar. One method includes, by example, managing computer-based documents including selecting, with a computing device, a first event included in a calendar program, identifying a first participant associated with the first event, identifying a second event from the calendar program that is associated with the first event, selecting a first document that was accessed by the first participant proximate to the time of the second event, and creating a link to the first document in a first folder associated with the first event. The first document can be, for example, a word-processing document, a spread sheet document, a presentation document, an image, a video, an email document, a social network document or a web page.

Another aspect of disclosed implementations includes an apparatus for managing documents based on a user's calendar comprising a memory and a processor. The processor can be configured to execute instructions stored in memory to select a first event included in a calendar program, identify a first participant associated with the first event, identify a second event from the calendar program that is associated with the first event, identify a first document that was accessed by the first participant associated with the second event, and create a link to the first document in a first folder associated with the first event.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
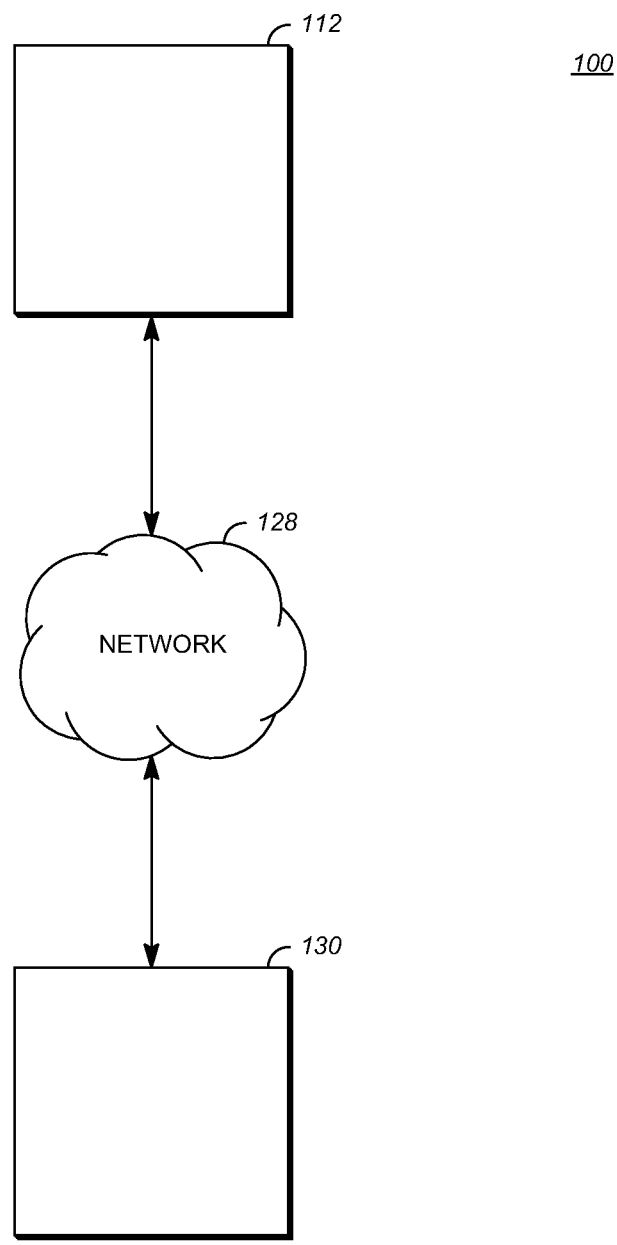
FIG. 1 is a schematic of a networked calendar system.

Calendaring software programs (calendars) are useful additions to a user's computing devices. Calendars can store and display events useful to a user, permitting a user to review future events in order to prepare for them, be reminded of current events as they occur and serve as a record of past events. An event is, for example, an entry in a calendar software program that has a start time and duration, a title or subject and a list of one or more participants. Calendar software programs can store and display events, permitting a user to view a calendar display that includes the events and be reminded when the time for an event occurs.

A meeting is a type of event that can include multiple users having computing devices. When the time for a particular meeting occurs, users can be reminded to go to a conference room to participate in a face-to-face meeting with the other participants, for example. In other cases, when the time for a particular meeting occurs, users can be reminded to connect electronically with the other meeting participants, using a video and/or audio conference system to communicate with the other participants, for example.

Some meetings recur on a regular schedule. For example, participants working on a project together can meet weekly to discuss issues related to the project. In this example, participants may desirably refer to the same documents on a regular basis. For example, participants may desirably refer to a copy of the overall project schedule and update the schedule and lists of tasks associated with the schedule. A given set of documents associated with a meeting can be difficult to recall and re-assemble when required by a participant in a current meeting. Such problems can arise, for example, due to the large volume of documents that a user can acquire or create in the normal course of using a computing device at work.

Aspects of disclosed implementations can identify a second meeting associated with a current meeting, identify documents that were accessed in association with the second meeting and file links to the documents in a folder associated with the calendar entry for the current meeting. Such a folder can include links to documents associated with any number of current events. For example, the folder can include links to documents associated with multiple events including meetings that occur on a given day.

Aspects of disclosed embodiments can also be useful in cases where a user has multiple computing devices associated with a calendar. For example, a user can have a desktop computer at work, a laptop at home and a mobile device (smart phone), all having copies of the same calendar program, with documents stored on a data server (cloud storage). The user may be using any one of the devices at the time the event occurs. Aspects of disclosed embodiments can identify second events associated with an upcoming event and identify documents created or accessed on any one of the multiple computing devices associated with the user's calendar and link to them from any one of the multiple computing devices.

First discussed below are environments in which aspects of this disclosure can be implemented.

FIG. 1 is a schematic of a networked calendar system 100. An exemplary computing station 112 can be, for example, a computer having an internal configuration of hardware such as that described in FIG. 2. However, other suitable implementations of computing station 112 are possible. For example, the processing of computing station 112 described hereinafter can be distributed among multiple devices.

A network 128 can connect computing station 112 and a server station 130 for storing documents or calendar information. For example, a document can be created at computing station 112 and transmitted to cloud storage at server station 130. Network 128 can be, for example, the Internet. Network 128 can also be a local area network (LAN), wide area network (WAN), virtual private network (VPN), cellular telephone network or any other means of transferring the data between computing station 112 and server station 130.

Figure 2:
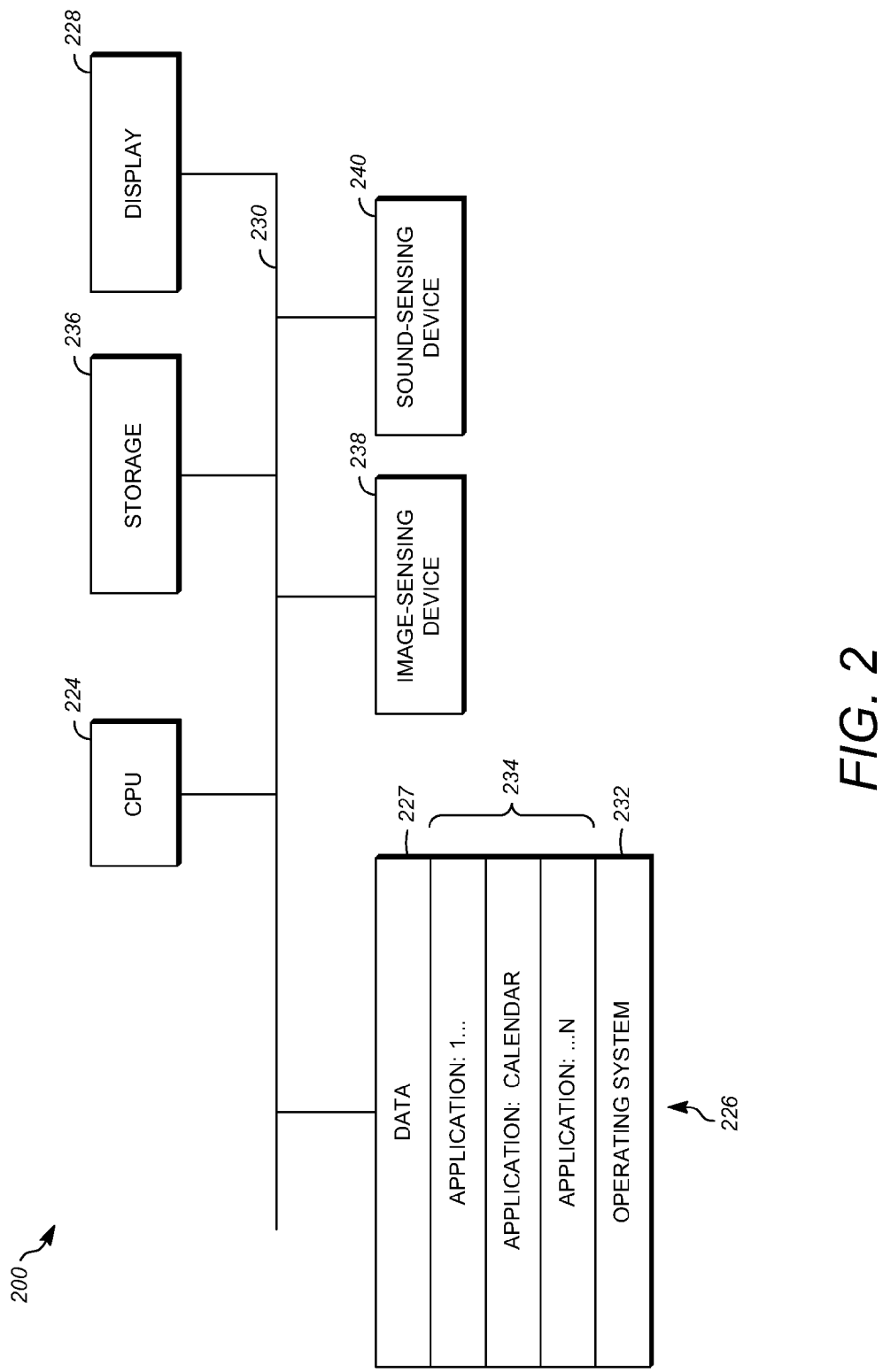
FIG. 2 is a block diagram of an exemplary computing device that can implement a station of the networked calendar system of FIG. 1.

Server station 130, in one example, can be a computer having an internal configuration of hardware such as that described in FIG. 2. However, other suitable implementations of server station 130 are possible. For example, the processing of server station 130 described hereinafter can be distributed among multiple devices.

Other implementations of calendar system 100 are possible. For example, an implementation can omit network 128. In another implementation, documents may be created and then stored for transmission at a later time to server station 130 or any other device having memory. In one implementation, server station 130 receives (e.g., via network 128, a computer bus, and/or some communication pathway) the documents and stores documents for later access.

FIG. 2 is a block diagram of an exemplary computing device 200 that can implement a computing or server station. For example, computing device 200 can implement one or both of computing station 112 and server station 130 of FIG. 1. Computing device 200 can be in the form of a computer system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. For example, application programs 234 can include applications 1 through N, which further include a calendar and/or email messaging application that performs the methods described here. Computing device 200 can also include a secondary storage 236 that can, for example, be a memory card used with computing device 200 when it is mobile. Documents may contain a significant amount of information, so they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228, such as a keyboard or speakers. When the output device is or includes display 228, display 228 can be implemented in various ways, including by a liquid crystal display (LCD), a cathode-ray tube (CRT) or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 may be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 may be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
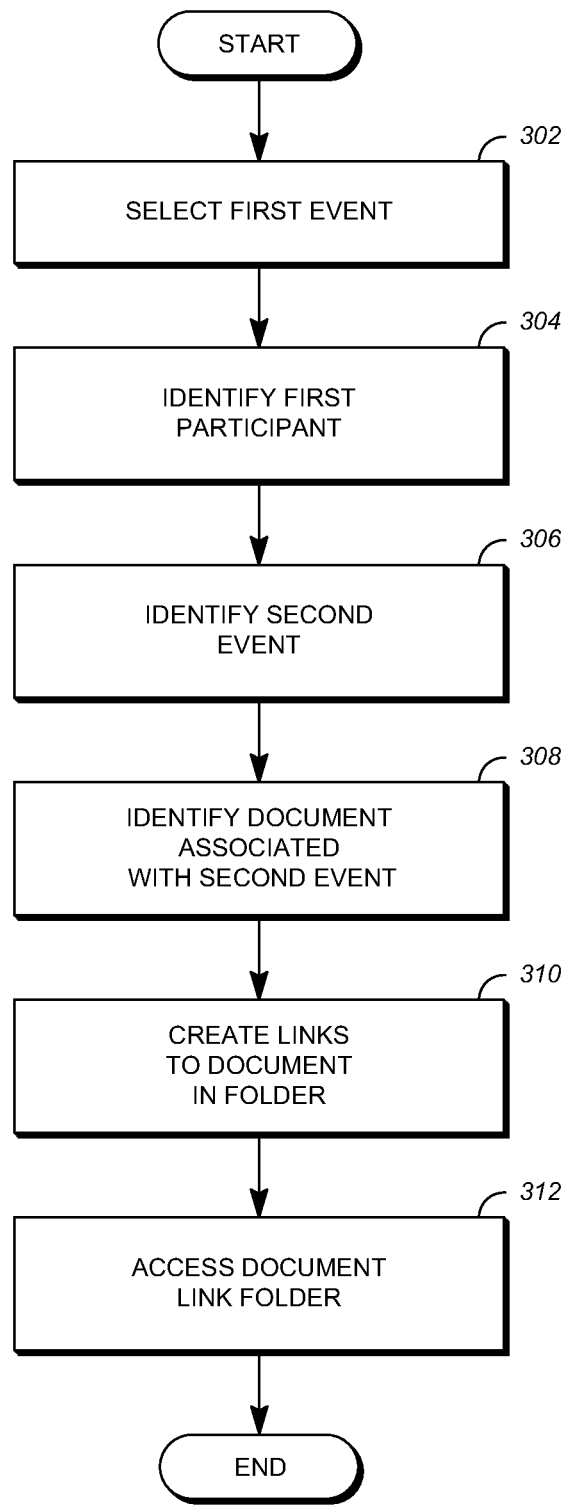
FIG. 3 is a flowchart of a process for managing documents based on a calendar event according to an implementation of this disclosure.

FIG. 3 is a flowchart of a process 300 for managing documents associated with a calendar event according to an implementation of this disclosure. Process 300 can be implemented, for example, as a software program that is executed by computing devices such as server station 112 or receiving station 130. The software program can include machine-readable instructions that are stored in a memory such as memory 226 that, when executed by a processor such as CPU 224, cause the computing device to perform process 300. Process 300 can also be implemented using hardware. As explained above, some computing devices may have multiple memories and multiple processors, and the steps of process 300 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

For simplicity of explanation, process 300 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 302, a first event is selected from a calendar program. By selected, as used herein, we mean chosen, indicated, identified, determined or in any manner whatsoever selected. The event can be any entry from a calendar program, including a meeting notice, an appointment, a reminder or any other entry. At step 304, a first participant in the selected event is identified. As used herein, identified means selected, indicated, determined or in any manner whatsoever identified. The first participant identified can be the user of the calendar program.

At step 306, a second event associated with the first event is identified. The second event can be, for example another meeting in a recurring series of meeting events, or the second event can be a second upcoming event associated with the first event, for example. The term "associated" as used herein can mean related, linked, connected or in any manner whatsoever associated. Examples of how calendar entries can be associated include being separate events in a recurring event series, having the same topic or title as another event, having the same participants as another event or having an association made between the two events by a user. Multiple events can also be identified at this step. In addition to recurring meetings, other criteria may be used to associate second events with a selected first event. For example, the calendar can be searched to find events with the same name or same group of participants. Aspects of disclosed implementations can search the contents of the event entries to find keywords or other tags that can identify the events as being associated.

At step 308, one or more documents associated with the second event or events can be identified. The term document, as used herein, includes but is not limited to: word processing documents, spread sheets, presentations, email messages, images, videos, sound files or web pages, for example. Aspects of disclosed implementations can identify documents to include in a folder by timestamps. Timestamps are time and date information included in a computer file that identifies when a particular document was created, modified or accessed. The process 300 can examine timestamps of documents associated with a user, either on one or more of the computing devices or server storage (cloud storage) associated with the user to determine if any documents were created, modified or accessed during the second event. The process can also examine the timestamps of documents to determine if they were created, modified or accessed within a predetermined period before or after the event. In the case where multiple events were identified at step 302, multiple documents associated with multiple events can be identified.

Aspects of disclosed implementations can also identify documents to be included in a folder by examining the title or contents of a document to find key words or other identifying phrases or data that can associate a document with an event. Documents can also be tagged by a user to indicate their association with an event to permit the document to be identified at a later date.

At step 310, links to the documents identified in step 308 are formed. Links are pointers that identify the location of a document without requiring the document to be copied or moved. The documents can also be copied to a location that permits quicker access, if desired. The links to the identified documents can be collected in a directory or folder for access by the user. Aspects of disclosed embodiments can also place this directory in other software programs on the computing device. For example, email messages identified as being associated with a second event can be collected in a folder that can be shown in the inbox display area of an email program as shown by example in FIG. 4. The folder can also be displayed in a user interface display associated with a dedicated application as shown by example in FIG. 5. The folder can also be displayed as part of the file system of the computing device.

At step 312, the user can access the folder to open, delete, rename or add to the list of documents identified by process 300 as being associated with the current event. The documents listed in the folder can also be shared with other participants in the event. Aspects of disclosed embodiments can also, with the user's permission, automatically share all documents associated with all participants in an event.

Figure 4A:
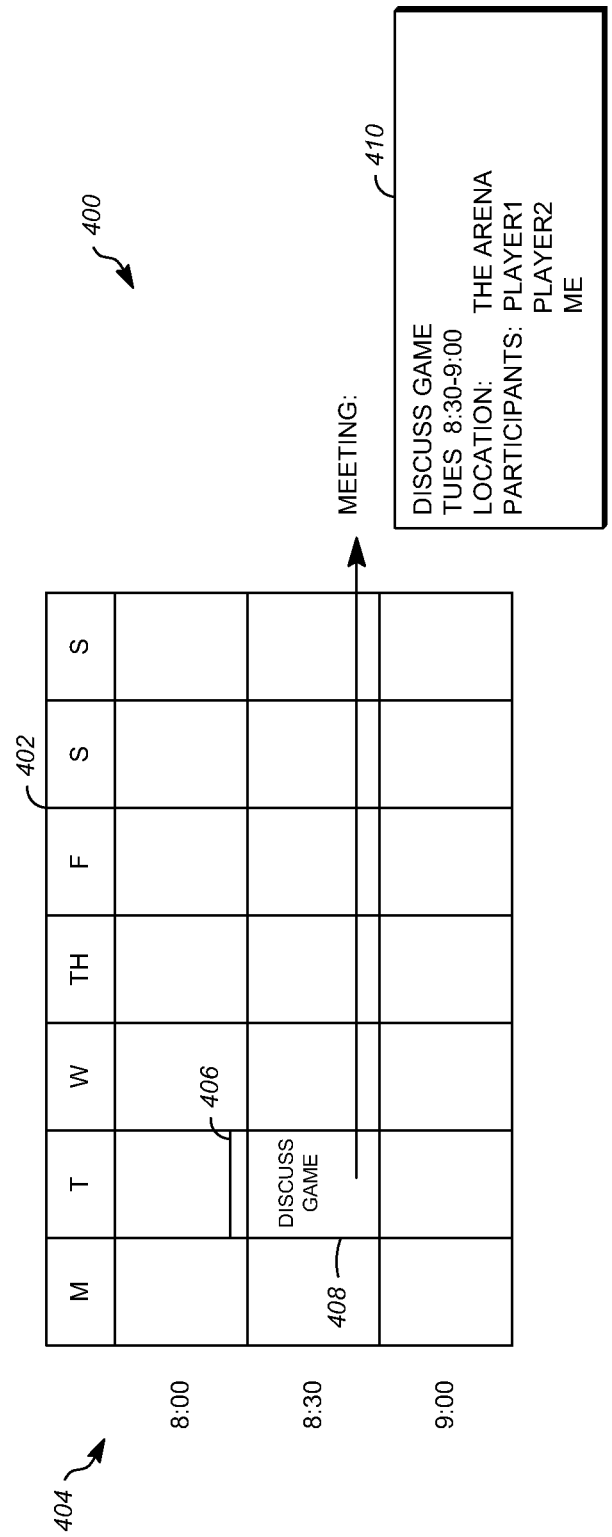
FIG. 4A is a view of a calendar display associated with a calendar software program that can be used with implementations of this disclosure.

FIG. 4A is a view of a calendar display 400 associated with a calendar software program that can be used with implementations of this disclosure. Display 400 displays a week's worth of events, including a header row 402 with the days of the week denoted. A body 404 of display 400 includes rows representing ½ hour increments of the day. Body 404 of display 400 scrolls up and down to display the entire day. Display 400 includes a line 406 that can indicate the current time and day. An event 408 is shown as an entry in display 400. Clicking on event 408 can bring up a pop-up window 410 that displays details of the event, including the title, time and duration, and participants.

Figure 4B:
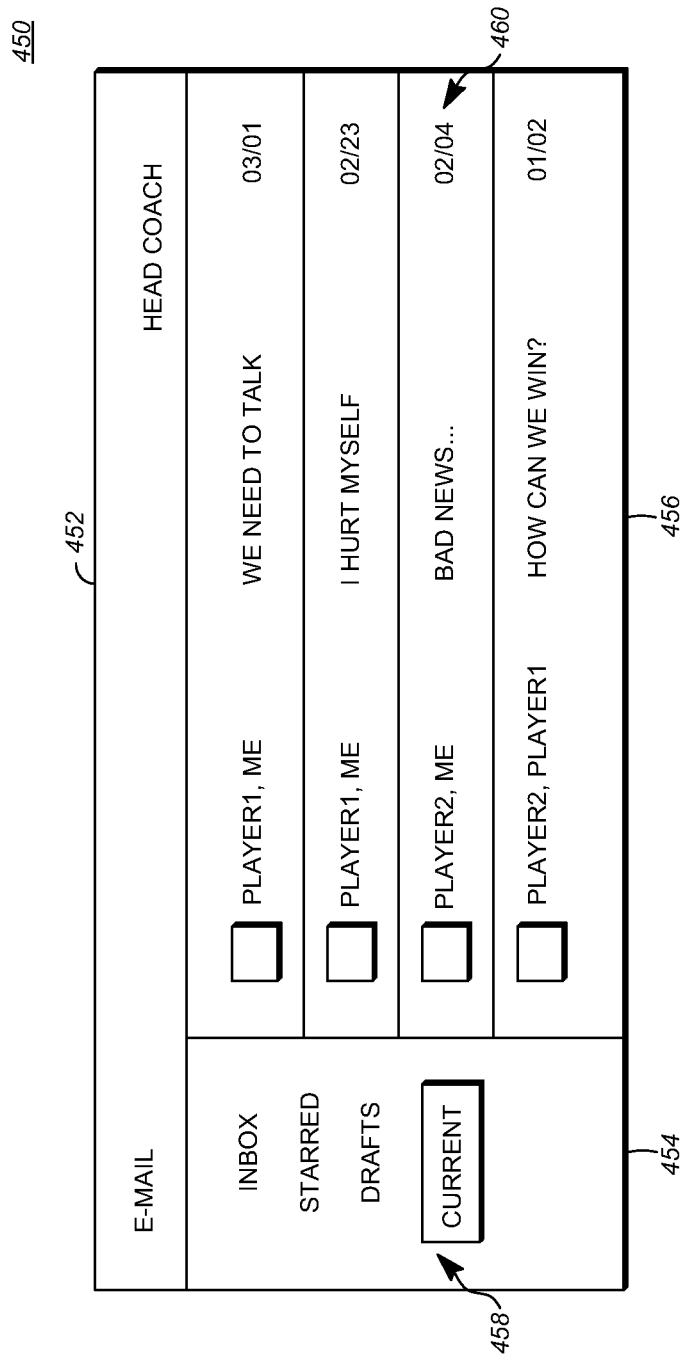
FIG. 4B is a view of an email display associated with an email software program that can be used with implementations of this disclosure.

FIG. 4B is a view of an email display 450 associated with an email software program that can be used with implementations of this disclosure. Display 450 includes a header display area 452, a folder display area 454 and a message list display area 456. Selecting a folder, for example a folder 458 labeled "Current" in folder display area 454 (hereinafter the Current folder) displays email messages 460 included in Current folder 458 in message list display area 456. Aspects of disclosed embodiments can populate Current folder 458 associated with an email software program associated with a user with emails that include senders and recipients that are included in a participants list associated with an upcoming event listed in a calendar software program also associated with the user.

Aspects of disclosed implementations can select email messages 460 to include in Current folder 458 by examining the time the email was sent or received or by examining the title or contents of email messages 460 to see if they are associated with the title or subject of an upcoming event. Email messages 460 can also be examined to determine if they are included in a topic thread that can be associated with an upcoming event, in which case email messages 460 can be included in Current folder 458.

Aspects of disclosed implementations can also manage Current folder 458 by clearing previous entries and updating email messages 460 included in Current folder 458 on a daily basis. In this case, email messages 460 from previous days can be deleted from Current folder 458 and be replaced with email messages associated with events occurring in the current day. Current folder 458 can be also cleared and updated at different intervals, if desired.

Although the calendar and email software programs are described as separate programs in this example, they can be incorporated into a single program with different modules.

Figure 5:
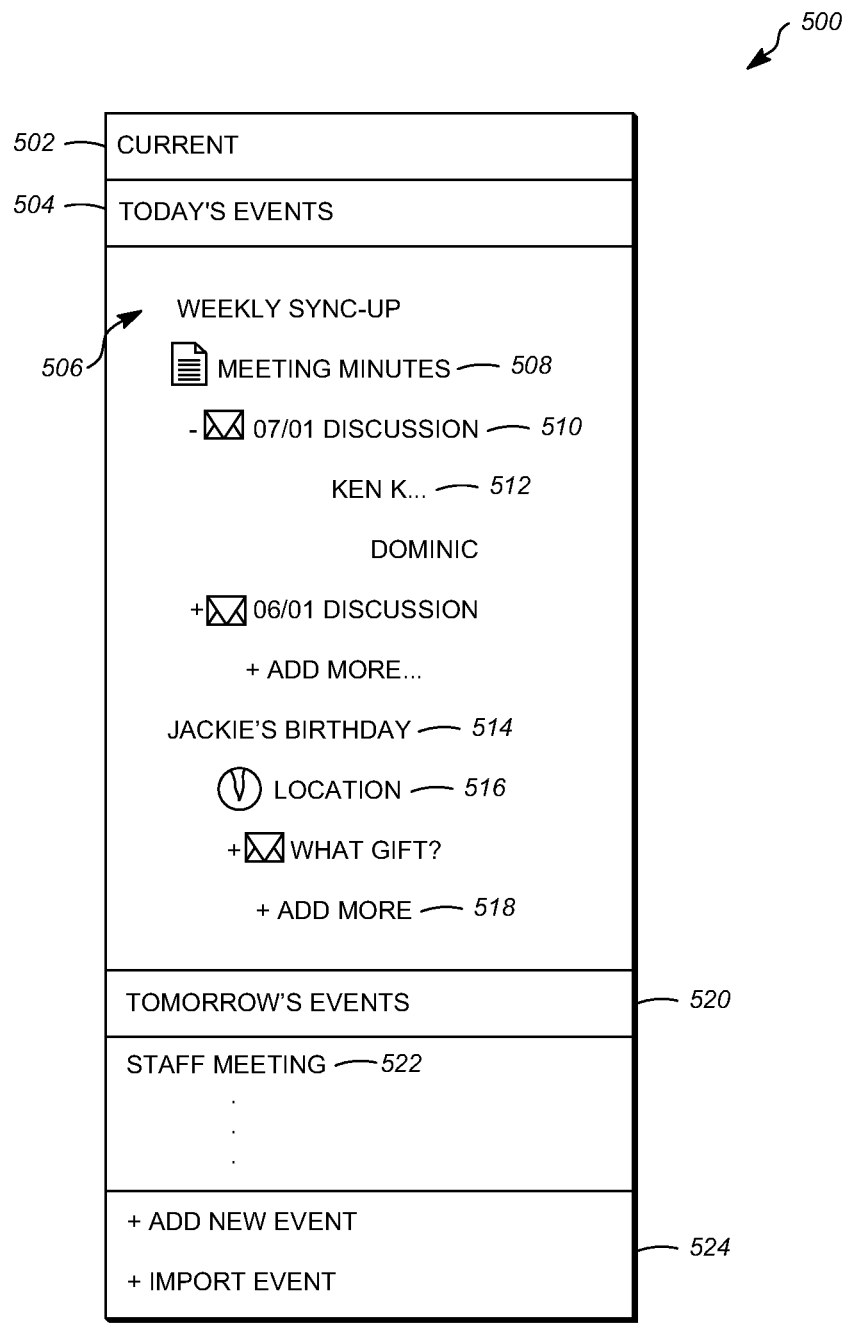
FIG. 5 is a diagram of a user interface display for managing a folder including multiple types of documents associated with calendar events.

FIG. 5 is a diagram of a user interface display 500 for managing a folder including multiple types of documents associated with calendar events. In this case, Current folder 458 is not associated with a single software program such as the email software program shown in FIG. 4, but rather can collect multiple types of documents associated with an event including word processing documents, spread sheets, presentations, email messages, images, videos, sound files or web pages, for example.

Display 500 for Current folder 458 can include a header 502 and a first display section 504 titled "Today's Events" that includes documents associated with today's events. A first event 506, titled "Weekly Sync-up" includes documents 508, 510, 512. First document 508 is labeled "Meeting Minutes" and can be identified by its time stamp, for example, as being associated with first event 506 ("Weekly Sync-up"). Note that the entry for first document 508 ("Meeting Minutes") includes an icon identifying it as a word processing document. A second document 510 titled "07/01 Discussion" is preceded by a "+/−" symbol. This symbol indicates that multiple documents are associated with this entry. Clicking on a "+" symbol in front of an entry changes it to a "−" symbol and displays additional documents 512 associated with the second document 510 titled "07/01 Discussion." Second document 510 ("07/01 Discussion") includes an icon that identifies it as a collection of email messages. The icons that precede additional documents 512 identify them as being email messages from individuals.

A next event 514 in display section 504 ("Today's Events" 504) can be an event 514 titled "Jackie's Birthday." Event 514 includes a map 516 indicated by the icon preceding the word "Location," along with other documents 518. The entry "ADD MORE," preceded by a "+" symbol, permits a user to click on the "+" symbol to bring up an interface object that prompts the user to identify an additional document to add to the event 506 ("Weekly Sync-Up") or the event 514 ("Jackie's Birthday").

A second display section 520 titled "Tomorrow's Events" can include events, for example an event 522 labeled "Staff Meeting," along with documents associated with event 522 that will occur tomorrow. A third display section 524 includes entries that permit a user to add new events to a selected day or import events from a calendar software program.

Figure 6:
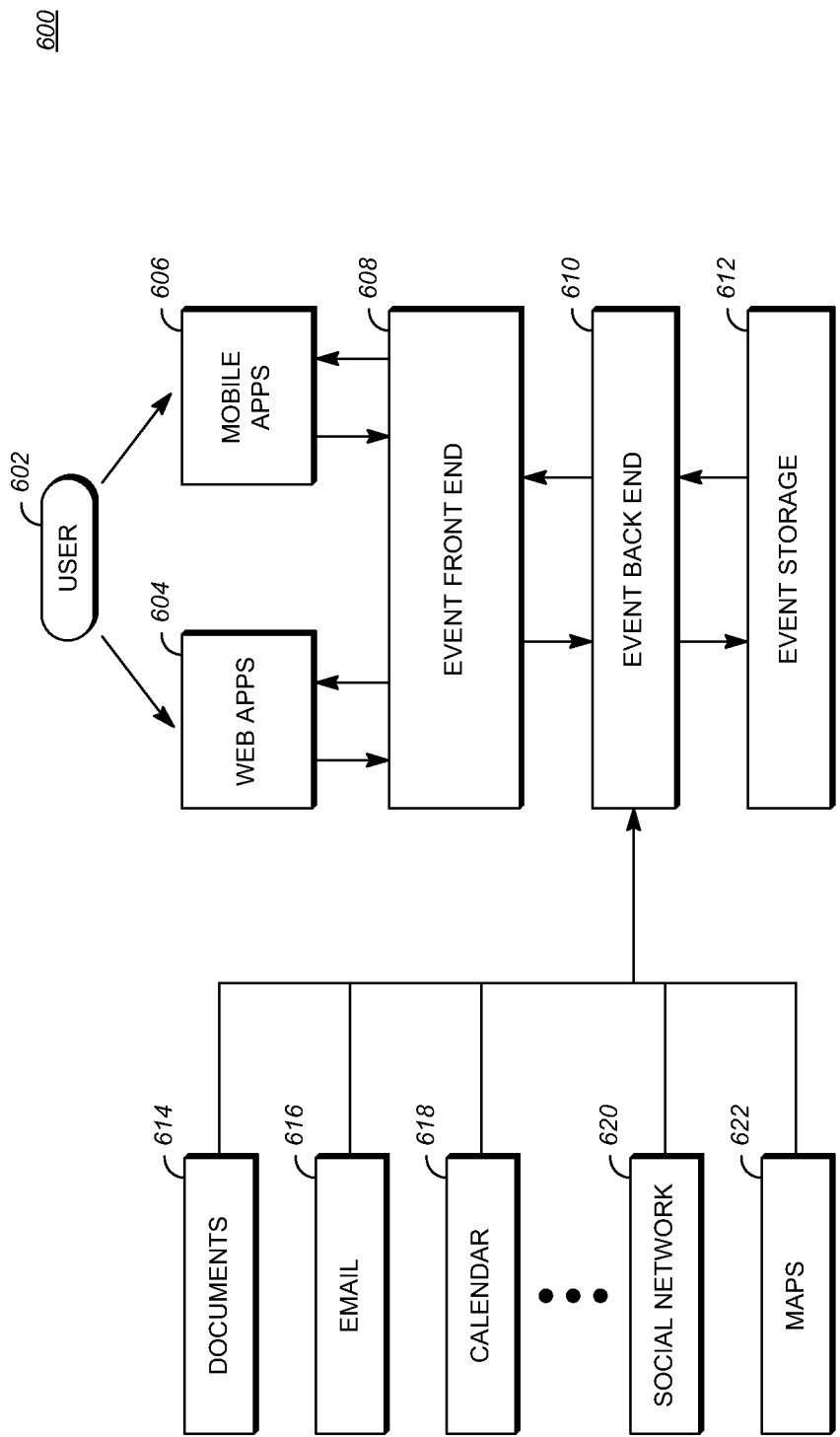
FIG. 6 is a diagram of software architecture for a managing documents based on a calendar according to a disclosed implementation.

FIG. 6 is a diagram of software architecture 600 for managing documents associated with a calendar according to a disclosed implementation. A user 602 interacts with software of the user via either a web-based application 604 or a mobile application 606. Either web-based application 604 or mobile application 606 can present a user interface as shown in FIG. 5. Web-based application 604 can use either browser-based software that can be developed in a browser-based language such as HTML or XTML, for example, or a native application developed in a language such as Objective C. Mobile applications 606 are application software programs written to run on a mobile device such as a smart phone.

User 602 interacts with the event front end 608 via either web-based application 604 or mobile application 606. Event front end 608 is responsible for managing the user interface, an example of which was discussed in relation to FIG. 4. Managing the user interface includes displaying events and associated documents, adding events to the event list and attaching documents to an event.

An event back end 610 communicates with event front end 608 to manage the data to be provided to user 602 as part of the user interface. Event back end 610 communicates with a calendar software program to acquire events to be displayed in the user interface. Event back end 610 aggregates documents from various data sources and associates them with events as discussed above. Data sources used include documents 614 from word processing and other applications, email messages 616, calendars 618, social network programs 620 and maps 622, for example. Event back end 610 also fetches pre-requested events or newly created events from storage.

Event storage 612 serves as a backup storage facility, storing events and links to documents associated with events. The events and links can be stored locally on a computing device's storage devices, such as memory, disk drives or removable storage such as memory cards. The events and links can also use a network connection to be stored on a server or as part of cloud storage.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of computing station 112 and/or server station 130 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of computing station 112 and server station 130 do not necessarily have to be implemented in the same manner.

Further, in one aspect, for example, computing station 112 or server station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Computing station 112 and server station 130 can, for example, be implemented on computers in an email system. Alternatively, server station 130 can be implemented on a server and computing station 112 can be implemented on a device separate from the server, such as a hand-held communications device. In this instance, computing station 112 can transmit email messages that are recorded on server station 130. Either can incorporate the email into process 300. The communications device can also receive content stored locally on the communications device, for example, content that was not transmitted by server station 130. Other suitable computing station 112 and server station 130 implementation schemes are available. For example, computing station 112 can be a generally stationary personal computer rather than a portable communications device.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for managing computer-based documents, comprising:
    identifying, by a computing device using calendar information from a calendar program associated with a first participant, related events in the calendar program associated with the first participant, wherein the related events include a first event and a second event,
        wherein the first event is associated with a first time period on a specified day,
        wherein the first time period occurs in the present or in the future,
        wherein the second event is associated with a second time period,
        wherein the second time period occurred in the past,
        wherein the calendar program includes, for the first participant and for the specified day, first participant events including the first event,
        wherein the calendar information includes at least one of event title, event participant list, event tag, or event topic, and
        wherein the identification of the related events is made when at least some of the calendar information associated with the second event matches at least some of the calendar information associated with the first event;
    identifying a first document associated with the second event, wherein the first document was created, accessed, or modified by the first participant during the second time period, and wherein the first document is inaccessible by a second participant of the first event;
    creating, in a folder of a directory, a link to the first document,
        wherein the folder is a folder of the first participant and the folder is inaccessible to the second participant of the first event,
        wherein the folder is associated with the first event, and
        wherein the directory is part of a program other than the calendar program, is associated with the specified day, and includes respective folders for some of the first participant events including the folder associated with the first event;
    responsive to a selection of the specified day in the program, displaying the directory, the respective folders including the folder associated with the first event, and the link to the first document; and
    sharing, with a permission of the first participant, the folder and the link with the second participant of the first event.

2. The method of claim 1 wherein identifying the first document, further comprises:
    determining that the first document was accessed by the first participant proximate to the second time period.

3. The method of claim 1 wherein identifying the first document further comprises:
    comparing text included in the first document with an event title of the second event.

4. The method of claim 1 wherein the first document is at least one of a word-processing document, a spread sheet document, a presentation document, an image, a video, an email document, a social network document or a web page.

5. The method of claim 1 wherein the first event and the second event are from a recurring series of related events.

6. The method of claim 1, further comprising:
    identifying a second participant in the second event;
    identifying a second document that was created, accessed, or modified by the second participant during the second time period;
    creating a link to the second document in the folder associated with the first event; and
    displaying the link to the second document with the folder associated with the first event.

7. The method of claim 6 wherein identifying the second document further comprises:
    determining that the second document was accessed by the second participant proximate to the second time period.

8. The method of claim 6 wherein identifying the second document further comprises:
    comparing text included in the second document with an event topic of the second event.

9. The method of claim 1, further comprising:
    permitting the first participant to identify with a user interface element an additional document to associate with the first event.

10. The method of claim 1, further comprising:
    updating the folder at a time interval.

11. The method of claim 1, further comprising:
    associating the first document with the first event based on an association of the first event to the second event and an association of the first document to the second event.

12. An apparatus for managing computer-based documents, comprising:
    a memory; and
    a processor configured to execute instructions stored in memory to:

identify, using calendar information from a calendar program associated with a first participant, related events in the calendar program associated with the first participant,
  wherein the related events include a first event and a second event,
  wherein the first event is associated with a first time period on a specified day,
  wherein the first time period occurs in the present or in the future,
  wherein the second event is associated with a second time period,
  wherein the second time period occurred in the past,
  wherein the calendar program includes, for the first participant and for the specified day, first participant events including the first event,
  wherein the calendar information includes at least one of event title, event participant list, event tag, or event topic, and
  wherein the identification of the related events is made when at least some calendar information associated with the second event matches at least some of the calendar information associated with the first event;
identify a first document associated with the second event, wherein the first document was created, accessed, or modified by the first participant proximate to the second time period, wherein the first document is inaccessible by a second participant of the first event;
create, in a folder of a directory of the first participant associated with the first event, a link to the first document,
  wherein the folder is a folder of the first participant and is inaccessible to the second participant of the first event,
  wherein the folder is associated with the first event, and
  wherein the directory is part of a program other than the calendar program, is associated with the specified day, and includes respective folders for some of the first participant events including the first event;
based on selection of the specified day in the program, display the directory, the respective folders including the folder associated with the first event, and the link to the first document; and
share, with a permission of the first participant, the folder and the link with the second participant in the first event.

13. The apparatus of claim 12 wherein the processor is configured to identify the first document by comparing text included in the first document with an event title of the second event.

14. The apparatus of claim 12 wherein the first event and the second event are from a recurring series of related events.

15. The apparatus of claim 12 wherein the processor is configured to:
  identify a second participant in the second event;
  identify a second document that was created, accessed, or modified by the second participant during the second time period;
  create a link to the second document in the folder; and
  displaying the link to the second document with the folder.

16. The apparatus of claim 15 wherein the processor is configured to identify the second document by determining that the second document was accessed by the second participant proximate to the second time period.

17. The apparatus of claim 15 wherein the processor is configured to identify the second document by comparing text included in the second document with an event topic of the second event.

18. The apparatus of claim 15 wherein the second document is at least one of a word-processing document, a spread sheet document, a presentation document, an image, a video, an email document, a social network document or a web page.

19. A non-transitory computer-readable storage medium, comprising executable instructions that, when executed by a processor, facilitate performance of operations for managing computer-based documents, comprising:
  identifying, using calendar information from a calendar program associated with a first participant, related events in the calendar program associated with the first participant,
    wherein the related events include a first event and a second event,
    wherein the first event is associated with a first time period on a specified day,
    wherein the first time period occurs in the present or in the future,
    wherein the second event is associated with a second time period,
    wherein the second time period occurred in the past,
    wherein the calendar program includes, for the first participant and for the specified day, first participant events including the first event,
    wherein the calendar information includes at least one of event title, event participant list, event tag, or event topic, and
    wherein the identification of the related events is made when at least some calendar information associated with the second event matches at least some of the calendar information associated with the first event;
  identifying a first document associated with the second event, wherein the first document was created, accessed, or modified by the first participant during the second time period, and wherein the first document is inaccessible by a second participant of the first event;
  creating, in a folder of a directory, a copy of the first document, wherein the directory is part of a program other than the calendar program and is associated with the specified day, and wherein the folder is associated with the first event;
  sharing, with a permission of the first participant, the folder and the copy of the first document with the second participant of the first event; and
  based on selection of the specified day in the program, displaying the copy of the first document.

* * * * *